Jan. 21, 1936.  A. D. EITZEN.  2,028,505
LAMP AND LENS HOUSING FOR PROJECTORS
Original Filed May 31, 1930   3 Sheets-Sheet 1

Fig. 1

INVENTOR
August D. Eitzen,
BY Gustav Drews
ATTORNEY

Jan. 21, 1936.         A. D. EITZEN         2,028,505
         LAMP AND LENS HOUSING FOR PROJECTORS
         Original Filed May 31, 1930   3 Sheets-Sheet 2

INVENTOR
August D. Eitzen,
BY Gustav Drews
   ATTORNEY

Jan. 21, 1936.           A. D. EITZEN           2,028,505
LAMP AND LENS HOUSING FOR PROJECTORS
Original Filed May 31, 1930    3 Sheets-Sheet 3

INVENTOR
August D. Eitzen,
BY Gustav Drews
ATTORNEY

Patented Jan. 21, 1936

2,028,505

UNITED STATES PATENT OFFICE 2,028,505

LAMP AND LENS HOUSING FOR PROJECTORS

August D. Eitzen, Rockville Centre, N. Y., assignor to News Projection Corporation, New York, N. Y., a corporation of New York Application May 31, 1930, Serial No. 457,880
Renewed September 25, 1934

58 Claims. (Cl. 88—24)

The invention relates to projecting apparatus and especially to the lamp and lens housing, lens and mirror supporting means or arrangements, etc., of such apparatus.

The principal objects are: to provide a lamp, lens and mirror housing or supporting mechanism of generally improved construction and especially in which the various lenses, mirror and reflector are secured or supported in such manner that they may be easily and quickly removed and replaced, as in adapting the projector for different focal distances, etc., and when inserted will automatically be located in proper positions; to mount certain parts, such as certain of the condensing lenses and reflector, in individual supports or sub-housings which are removable from the main housing as units, and in which sub-housings the active elements, such as lenses or reflector, are mounted for quick and easy removal and replacement; to provide improved and adequate means for ventilation and cooling, including guards or shields limiting access of heat to certain parts, such as lenses, reflector and outer walls of the main housing; and to so construct and arrange various parts as to provide for uniform expansion and prevent injury to various active elements, such as lenses or reflector, by providing yieldable securing or supporting means which practically eliminate possibility of chipping or cracking such active elements when they expand by heating.

As here shown, the invention is embodied in a structure especially adapted for the projection of stock quotations or other subject matter from a tape; but it is not necessarily limited to such an adaptation.

These and other features, capabilities and advantages of the invention will appear from the subjoined detail description of one embodiment thereof, illustrated in the accompanying drawings, in which.

The complete housing structure comprises two principal parts—the main or lamp housing 10, and a second housing 11 arranged as an extension and conveniently referred to in some cases as the "extension housing" and containing principally a mirror and one of the condensing lenses, as will appear.

The main housing 10 comprises a front wall or plate 12 having top, bottom and side flanges 13, 14 and 15, respectively, and a rear wall or plate 16 having top, bottom and side flanges 17, 18 and 19, respectively. These plates are connected by top corner strips 20 of angle section, the ends of which are inserted within the respective plate flanges, and bottom corner strips 21 of angle section and of larger dimensions, the ends of which overlap the front and rear plate flanges externally. The housing as so far described, is practically a frame having open sides, top and bottom, a solid rear wall and a front wall which has a lens aperture later referred to. This frame may be additionally reenforced as by side and bottom corner braces 22 and 23.

The removable side walls 24 have at the bottom a clip 25 to engage over the upright member of a bottom corner strip 21 and at the top hooks 26 to engage over an upper corner member 20 thus permitting quick attachment and removal of the side plates without use of tools. Desirably, each side plate has a guard or shield plate 27 of thin sheet metal, spaced from its inner face and supported as by extensions of the metal strips which constitute the clip 25 and hooks 26. These inner plates protect the side walls from lamp heat keeping them quite cool and also assist in providing an air passage to carry heat upward to the top opening provided in the cover. This cover 28 has flanges 29 fitting over the upper margins of the front, rear and side walls, and a large central opening 30 for ventilation. A guard plate 31 is supported by posts 32 below the opening, being of larger dimensions than the opening preventing light leakage and providing ventilation while the cover is in position, and also preventing dust and dirt from falling into the housing.

The extension housing 11 has a slanting lower front wall 33, side walls 34 and a top wall 35 provided with the long rectangular light aperture 36 near its outward edge. The space between the slanting front wall and the top wall is closed by a door 37 hinged at 38 and secured in closed position by studs 39 passing through holes 40 in the door. The studs are carried by brackets 41 secured to the side walls and they have slotted heads 42 in which engage hooks 43 pivoted on the door.

The lamp socket 44 is carried by a sheet metal bracket 45 projecting from the front wall 12. The socket is detachably and adjustably mounted on the bracket, the top face of which has slots 46 extending from its rear edge. The socket has side lugs 47 and screws 48 which pass through the lugs and the slots. Nuts 49 cooperate with the screws to retain the socket in its desired adjusted position longitudinally of the bracket and housing.

The reflector 50 is carried by a sheet metal frame or plate 51 having edge flanges 52 for stiffening. On its rear face are a plurality, preferably four studs 53 having flange portions 54 resting against the plate, circular shoulder portions 55 of smaller diameter extending from the flanges, and beyond the shoulder portions, outwardly flaring conical heads 56. The rim of the reflector rests on the flanges and the inward segments of the shoulder portions 55 to positively locate the mirror in centered position on, and spaced from the frame plate and is retained by a resilient split ring 57 of heavy spring wire, having angularly bent ends 58 for grasping, and engaging the conical stud heads to retain the mirror in an obvious way, and permitting quick and easy removal for cleaning or replacement. Desirably, the frame or plate 51 is designed to cut off all except the necessary amount of light for reflection to the condensers, angle mirror and light aperture and therefore the plate portion is continuous except for the rectangular light aperture 59 centrally located with respect to the reflector axis and having its long axis horizontal.

At the top center a sleeve stud 60 is secured to the plate, extending rearward and this fits on a supporting rod 61 secured to and projecting forward from the rear wall of the housing near its top. The reflector is mounted by passing its frame through one of the side openings on the top of the housing and slipping the sleeve over the rod and moving it backward or forward until focused. A pad 62 of felt or similar material may be cemented to the reflector at the center to engage the rear wall and prevent possible injury. The frame is then secured in position by tightening a set screw 63 threaded into the sleeve and engaging the rod. In this way the mirror is conveniently located in proper position in respect to the filament of lamp 64 and in relation to the first or primary set of condensers later referred to. If necessary, the lamp socket may be moved forward somewhat on its bracket to permit replacement or removal of the reflector.

The reflector plate 51 is spaced from the reflector rim by reason of the location of the latter upon the spacing flanges 54 so that there is practically no unnecessary conduction to the reflector, also, ventilation is provided between it and the plate for upward circulation of air. The plate also acts as a shield cutting off the greater part of light and heat rays from the mirror, only the necessary part of the total light being admitted by the aperture 59 so that altogether the reflector is kept at a relatively low temperature and expansion is minimized. Expansion, however, is practically uniform and the reflector is retained by the resilient snap ring so that there is no positive resistance to expansion, and fracture of the reflector by expansion is practically prevented.

The first or primary condensing lenses 65 and 66 are supported in a mount or lens holder 67 consisting of a substantially conical metal body. At its inward end this body has a shallow flange 68 located at the inner edge of a shallow cylindrical shoulder 69 and the periphery of the lens is located in the socket thus formed, resting against the flange and centered by the shoulder. It is retained detachably in position by a split ring 70 similar to ring 57 previously mentioned and located in a circular undercut 71, having a conical face 72 which, when the ring is permitted to expand forces it to engage the periphery of the lens and retain it in position. At its outer end the lens mount or body has similar flange and shoulder formations 68 and 69 to receive the periphery of the larger or second condensing lens 66 of the primary pair, which is detachably retained in position in a similar manner by a split ring 73 located in an undercut groove 74 similar to the one previously mentioned.

Desirably, a shield is provided at the inward end of the lens frame or body and between the inward lens and the lamp. This is in the form of a plate 75 secured in spaced relation to the lens frame as by rivet studs 76 and having a central rectangular light aperture 77 of suitable size to pass only the required part of the total light from the lamp and reflector, and shielding the lenses and their housing from heat conduction and radiation in a manner similar to the action of shield 51 with respect to the reflector and also affording ventilation or air circulation, etc., as will be understood from the previous description of the reflector.

Figure 1:
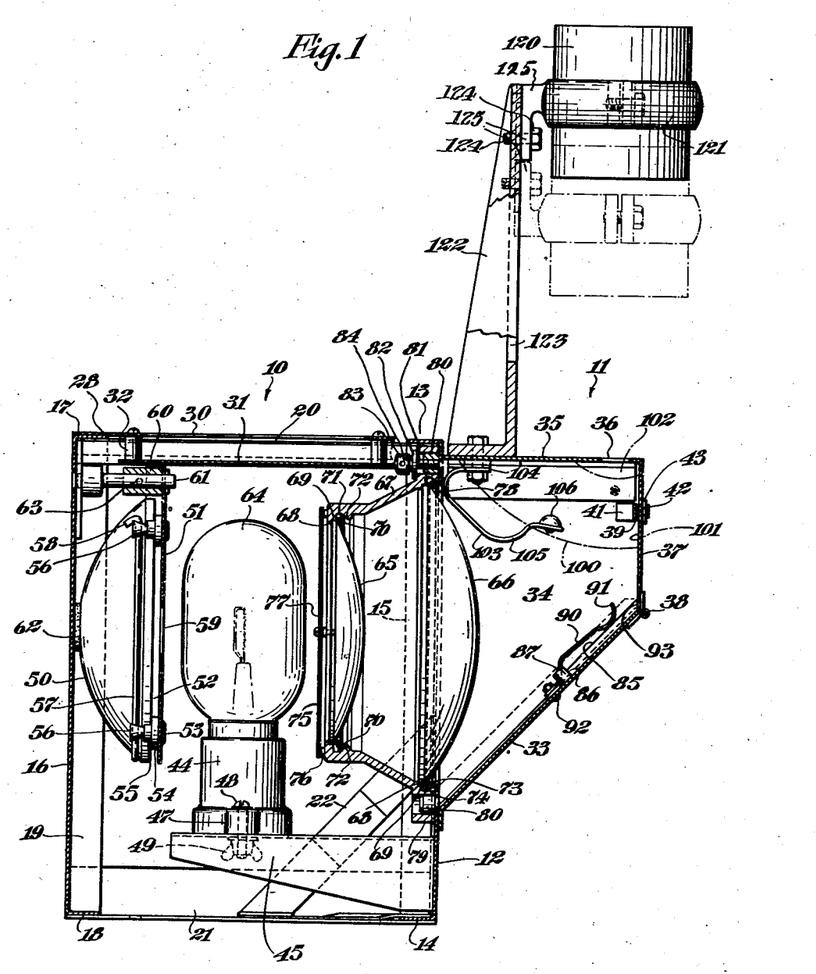
Fig. 1 is a vertical, longitudinal section of projecting apparatus, embodying the invention in one form.
Figure 2:
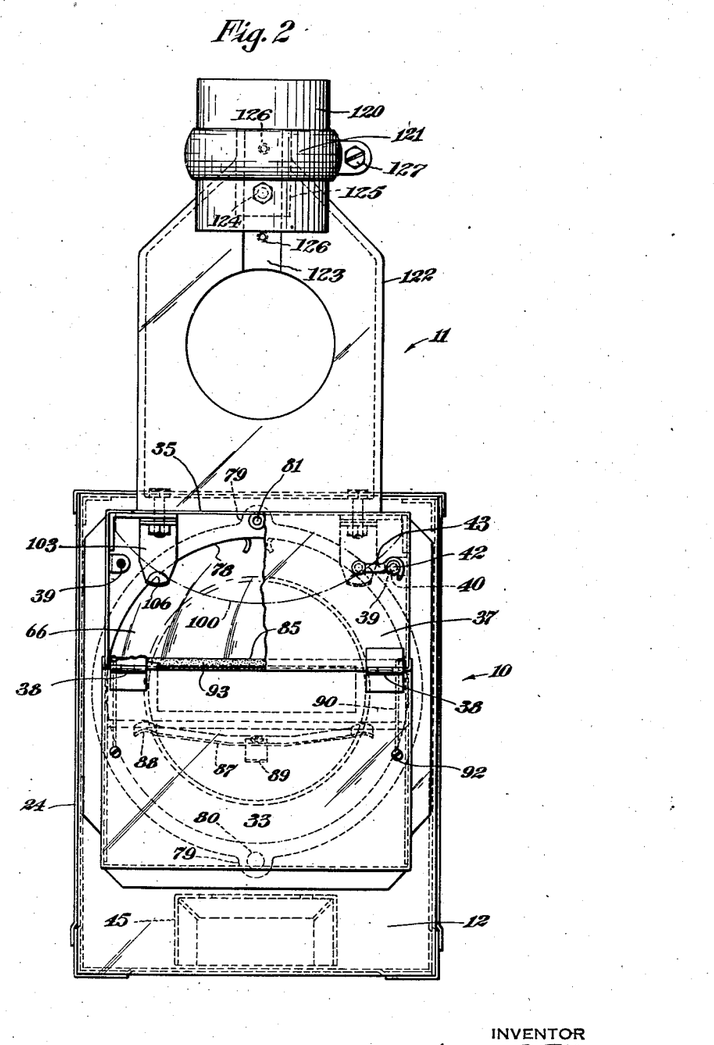
Fig. 2 is a front elevation with some parts broken away.
Figure 3:
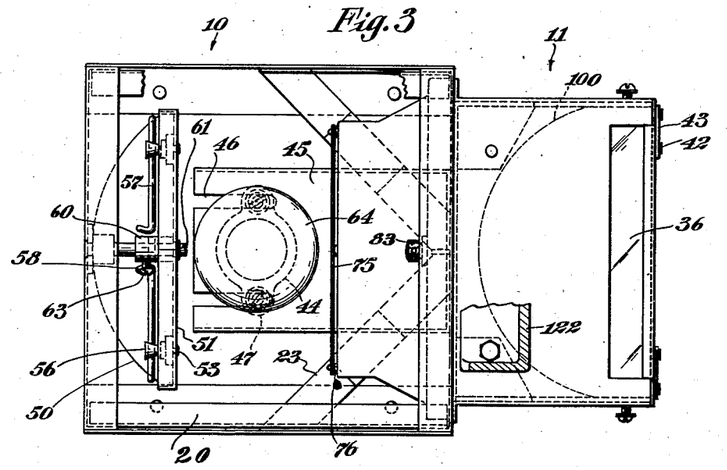
Fig. 3 is a top plan with the cover of the main housing removed and the objective and part of its supporting bracket removed.
Figure 4:
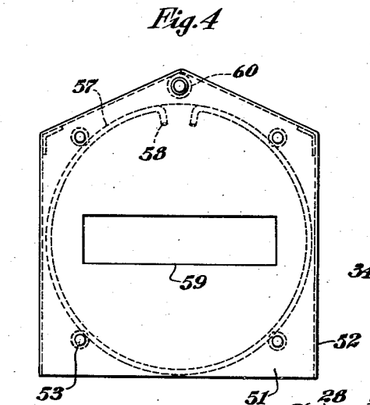
Fig. 4 is a front elevation of the reflector and its individual mounting or housing separated from other parts.
Figure 5:
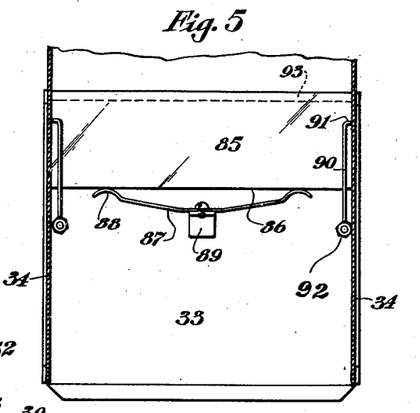
Fig. 5 is a detail plan view looking from the inside outward, of the mirror and its supporting or securing means.
Figure 6:
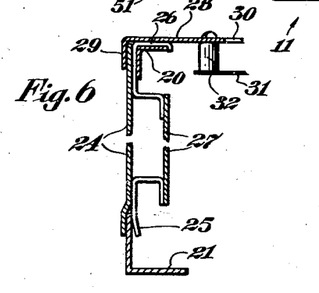
Fig. 6 is a vertical section showing details of the main housing, side plate construction, etc.

The front housing wall 12 has in its upper portion a circular aperture 78 of substantially the same diameter as the second condensing lens 66 permitting the latter to project into the extension housing 11 when the lens mount is properly located, as shown, with its forward face against the inward face of the front wall, about the aperture. The lens frame is detachably supported by ears 79 at its top and bottom, bored to receive studs or dowels 80 secured to the front wall as by riveting. These dowels have tapered inner ends to facilitate placing the frame lugs upon them. The frame is held in position by a set screw 81 engaged in a threaded bore in the upper dowel and having a flange 82 overlapping the lug and a knurled head 83 for finger manipulation and also if desired, holes 84 for insertion of a tool. When spaced on the studs in the position above referred to and as shown in Fig. 1, and secured by inserting and tightening of the screw, the entire primary lens group is automatically placed in the proper position with respect to the reflector and lamp, that is, it is at the proper distance on the axis or focal line from the lamp filament and reflector and the axis is also properly centered with respect to the intended common axis of the reflector and primary condensers. The primary lens group carried by its frame may be inserted into the housing and removed through either of the side apertures.

The angular mirror 85 is removably secured on the inner face of the upper portion of the slanting front wall 33 of extension housing 11, access being had to it for insertion or removal when the front door 37 is open. This mirror is oblong, of a size corresponding to the desired area of the light beam at this point and may be of a length equal to the width of the housing so that it is secured against end movement by engagement of its ends with the side walls 34. It is centered or located with respect to the beam axis in an upward or angular direction by engagement of its lower edge 86 with the ends of a flexible stop, in the form of a flat spring 87 having rounded end portions 88 engaging the mirror edge and secured at its center as by a screw or rivet to a bracket 89 riveted or otherwise secured to the inner face of wall 33. The mirror is prevented from upward displacement by spring clips 90 of flat metal or wire, having rounded end portions 91 engaging the upward face of the mirror near its ends and secured to wall 33 as by rivets or screws 92. The mirror has its upper or outer edge 93 beveled at an angle of 45° to the face plane so that after it is inserted under the spring clips 90 and pushed down until its inward end engages the end of the spring stop 87, when the door 37 is shut and secured its lower portion engages with the beveled outer edge of the mirror and moves the latter positively to correct position with accompanying slight yielding of the spring stop 87. The mirror is readily removable for cleaning or replacement, in an obvious way, when the door is opened.

The last, or in the present particular arrangement, the third condensing lens 100 is cut, that is, certain portions which are not required for the utilized portion of the total light beam are cut away. Thus, the otherwise circular planoconvex lens has a flat outer face 101 located at a distance from the lens axis slightly greater than one-half the width of the light aperture 36 and smaller segments of the lens are cut away at each end of the front face 101 leaving end faces 102 of small area, these being parallel and spaced apart a distance equal to the width of the extension housing so that the lens is centered laterally by engagement of the end faces 102 with the housing side walls. The lens is firmly but yieldingly held up with its main plane face in engagement with the under face of the top wall 35, by spring clips 103 secured to the top wall at 104 and having curved and forward and downward extending portions 105 terminating in brass buttons or cushions 106 which engage the under or spherical face of the lens near the side thereof and at points where they are not in the path of the utilized light beam. The lens is inserted when the front door 37 is open, being simply pushed under the spring clip pads 106 until its front face 101 is nearly flush with the open front of the housing and then the lens is forced back to final position and retained by closing the door, whereupon the front face of the lens is retained in engagement yieldingly but firmly with the inner face of the door by the action of the spring clips which are so positioned as to urge the lens forward or outward and also to hold it up in contact with the top wall. The lens is thus automatically correctly positioned with its axis in centered relation to the light beam reflected from the mirror and to the center of the light aperture 36.

With respect to each of the condensing lenses, it will be understood that any desired assortment of lenses may be provided, with suitable different spherical radii, but all of these lenses with respect to the first and second condensers 65 and 66 may have the same diameter and with respect to the third lens 100 may have the same peripheral outline and dimensions so that in the original set up of the projector with respect to a certain distance from the screen, desired size of screen image, etc., the various lenses may be selected even by relatively unskilled persons or by the aid of a chart or table, and when installed in the housings in a manner sufficiently above explained, they are conveniently located in proper positions with respect to the housing, the light source and the mirror, and the reflector is also conveniently located in the proper position.

The objective lenses in a cylindrical case 120 are adjustably secured in a split sleeve 121 carried by a bracket 122 projecting upward from the top wall of the extension housing 11, the axis of the objective being of course, aligned with the center of the aperture 36 and axis of condensing lens 100.

In the present instance, the bracket 122 has a vertically extending slot 123, the sides of which form both guides for centering the sleeve 121 and therewith the case 120, and also screwing means whereby a single screw 124 can be used extending from the arm 125 of the sleeve 121 and screwthreadedly connected with any one of a plurality of openings 126, three being shown in the present instance. The arm 125 is shown in full lines in Fig. 1 extending downwardly from the sleeve 121. However, as shown in dash and dot lines, the sleeve 121 may be inserted with the arm 125 extending upwardly. By this means, a greater variety of adjusting positions of the sleeve 121 may be readily obtained, to wit, six, when only three openings 126 are provided. Aside from the foregoing, finer adjustments in any one of the aforesaid six positions can further be obtained by movement of the case 120 relative to the sleeve 121 before locking the split sleeve 121 by means of the screw 127.

When the present structure or mechanism is employed in a complete projecting apparatus for projecting stock quotations or other data on a tape, the extension housing also has suitable guides for directing the tape over the light aperture 36 so that the light beam from the lamp and the reflector, of proper cross section, as determined by the apertures 59 and 77, passes through the primary condensers, is reflected by the mirror 85 and thrown out through the final condensing lens 100 and the light aperture 36, passes through the tape and thence to the objective lens for focusing upon the screen, with or without mirrors intermediate the objective and the screen, as will be understood by skilled persons. Since the present apparatus is not necessarily limited to use in market quotation or similar projectors, details of such tape guiding means are not here shown or described.

It is obvious that various changes and modifications may be made in the details of construction without departing from the general spirit of the invention set forth in the appended claims.

I claim:—

1. Projecting apparatus comprising a main housing, an extension housing having a light aperture, means providing a lens aperture between the housings, a lamp socket supported approximately centrally in the main housing, a lens mount in said main housing, a plurality of condensing lenses detachably secured in the mount, and cooperating means at spaced points on the mount and in the main housing for securing the mount detachably in position adjacent the lens aperture and in laterally and longitudinally centered relation to a determined light axis of the housing.

2. Projecting apparatus comprising a main housing, an extension housing having a light aperture, means providing a lens aperture between the housings, a lamp socket supported approximately centrally in the main housing, a lens mount, a plurality of condensing lenses detachably secured in axially aligned positions in the mount, and cooperating means including diametrically opposed studs and apertures on the mount and in the main housing for securing the mount detachably in position in the main housing to register with the lens aperture and in laterally and longitudinally centered relation to a determined light axis of the housing.

3. Projecting apparatus comprising a main housing, an extension housing having a light aperture, means providing a lens aperture between the housings, a lamp socket supported approximately centrally in the main housing, a lens mount, a condensing lens detachably secured in the mount, and cooperating means including a pair of apertures on the mount and a pair of studs in the main housing to engage the apertures in said mount for securing the mount detachably in position in the main housing to register with the lens aperture and in laterally and longitudinally centered relation to a determined light axis of the housing, said securing means including also a screw entering one of said studs and having a head bearing against said mount, and a reflector supported in the main housing and at the rear in respect to the condensing lens and socket.

4. Projecting apparatus comprising a main housing, an extension housing having a light aperture, means providing a lens aperture between the housings, a lamp socket supported approximately centrally in the main housing, a lens mount, a condensing lens detachably secured in the mount by means permitting ready attachment and detachment as between said lens and mount, cooperating means on the mount and in the main housing for permitting ready attachment and detachment of said lens and mount in position at the lens aperture and in laterally and longitudinally centered relation to a determined light axis of the housing, another condensing lens, and means including a spring for removably supporting said latter condensing lens in an upper portion of the extension housing with its axis in right-angularly centered relation to said light axis and in centered relation to said light aperture.

5. Projecting apparatus comprising a main housing, an extension housing having a light aperture, means providing a lens aperture between the housings, a lamp socket supported approximately centrally in the main housing, a lens mount, a condensing lens detachably secured in the mount by means permitting ready attachment and detachment as between said lens and mount, cooperating means on the mount and in the main housing for permitting ready attachment and detachment of said lens and mount in position at the lens aperture and in laterally and longitudinally centered relation to a determined light axis of the housing, a mirror angularly and detachably supported in the extension housing and in centered relation to said light axis, another condensing lens, and means including a spring for detachably supporting said latter condensing lens in an upper portion of the extension housing with its axis in right-angularly centered relation to said light axis and mirror and in centered relation to said light aperture.

6. Projecting apparatus comprising a main housing, an extension housing having a light aperture, means providing a lens aperture between the housings, a lamp socket supported approximately centrally in the main housing, one or more condensing lenses supported in the main housing and operatively between a lamp mounted in said socket and the extension housing, a reflector frame having a plurality of spaced supporting studs, a reflector detachably secured in the frame by said studs and a spring engaged therewith, and cooperating means including a sleeve on the reflector frame and a post in the main housing at the rear thereof for detachably supporting the reflector frame.

7. Projecting apparatus comprising a main housing, an extension housing having a light aperture, means providing a lens aperture between the housings, a lamp socket supported approximately centrally in the main housing, one or more condensing lenses supported in the main housing and operatively between a lamp mounted in said socket and the extension housing, a reflector frame having a plurality of spaced supporting studs, a reflector detachably secured in the frame by said studs and a spring engaged therewith, and cooperating means including a sleeve on the reflector frame and a post in the main housing at the rear thereof for detachably supporting the reflector frame in laterally and axially correct location with reference to a determined light axis of the housings and condensing lenses.

8. Projecting apparatus comprising a main housing, an extension housing having a light aperture, means providing a lens aperture between the housings, a lamp socket supported approximately centrally in the main housing, one or more condensing lenses supported in the main housing and operatively between a lamp mounted in said socket and the extension housing, a doorway having a door, a mirror, means including a removable spring for angularly and detachably securing the mirror in the extension housing in definitely centered relation to a determined light axis of the housing and condensing lenses and holding said mirror yieldingly adjacent to, and removably through said doorway, said door acting when closed to move said mirror into proper centered position, and a condensing lens detachably secured in an upper position in the extension housing with its axis in definitely centered right angular relation to said light axis.

9. Projecting apparatus comprising a main housing, an extension housing having a light aperture, means providing a lens aperture between the housings, a lamp socket supported approximately centrally in the main housing, a lens mount, a condensing lens detachably secured in the mount, cooperating means on the mount and in the main housing for securing the mount detachably in position at the lens aperture and in laterally and longitudinally centered relation to a determined light axis of the housing, the main housing having an aperture dimensioned to permit insertion and removal therethrough of the lens mount, a removable wall for said latter aperture, and a clip at the lower edge of said housing to anchor said removable wall against accidental displacement.

10. Projecting apparatus comprising a main housing, an extension housing having a light aperture, means providing a lens aperture between the housings, a lamp socket supported approximately centrally in the main housing, a lens mount, a condensing lens detachably secured in the mount, cooperating means on the mount and in the main housing for securing the mount detachably in position at the lens aperture and in laterally and longitudinally centered relation to a determined light axis of the housing, the main housing having an aperture dimensioned to permit insertion and removal therethrough of the lens mount, a removable wall for said latter aperture, a clip at the lower edge of said housing to receive the lower edge of said removable wall, and a cover for engaging the upper end of said removable wall and anchoring the same against accidental displacement.

11. A lens and lamp housing structure for projectors of the class described, comprising a main housing, an extension housing at the front thereof, having a rectangular, elongated light aperture in its upper wall, the front wall of the main housing having a lens aperture between the housings, a lamp socket supported in the main housing, a separate lens holder in said main housing, one or more condensing lenses detachably secured in the holder, cooperating means on the holder and in the housing for detachably mounting the holder in said housing adjacent to said lens aperture by sliding movement and designed to definitely locate the lenses laterally and longitudinally with respect to the light axis of the housing, means for securing the holder in position, the main housing having an aperture dimensioned to permit insertion and removal therethrough of said lens holder, said aperture being disposed parallel to the light axis of the housing, a removable wall for said latter aperture, and means for anchoring said wall against accidental displacement.

12. A lens and lamp housing structure for projectors of the class described, comprising a main housing, an extension housing at the front thereof, having a rectangular, elongated light aperture in its upper wall, the front wall of the main housing having a lens aperture between the housings, a lamp socket supported in the main housing, a separate lens holder, one or more condensing lenses detachably secured in the holder, a plurality of studs parallel to the direction of the light rays on the front wall of the main housing adjacent the lens aperture, the lens holder having lugs bored to receive and slidingly engage the studs, the main housing having an aperture dimensioned to permit insertion and removal therethrough of said lens holder, said aperture being disposed parallel to the light axis of the housing, a removable wall for said latter aperture, and means for anchoring said wall against accidental displacement.

13. A lens and lamp housing structure for projectors of the class described, comprising a main housing, an extension housing at the front thereof, having a rectangular, elongated light aperture in its upper wall, the front wall of the main housing having a lens aperture between the housings, a lamp socket supported in the main housing, a separate lens holder, one or more condensing lenses detachably secured in the holder, a plurality of studs on the front wall of the main housing adjacent the lens aperture, the lens holder having lugs bored to receive and slidingly engage the studs, and a screw cooperating with one of the studs and detachably securing the lens holder in position against the front wall of the main housing at the lens aperture and in laterally and longitudinally correct locations in respect to the light axis.

14. A lens and lamp housing structure for projectors of the class described, comprising a main housing, an extension housing at the front thereof, having a rectangular, elongated light aperture in its upper wall, the front wall of the main housing having a lens aperture between the housings, a lamp socket supported in the main housing, a separate lens holder, one or more condensing lenses detachably secured in the holder, cooperating means on the holder and in the housing for detachably mounting the holder therein by sliding movement parallel to the direction of the light rays and designed to definitely locate the lenses laterally and longitudinally with respect to the light axis of the housing, and means for securing the holder in position, the main housing having a side aperture dimensioned to permit insertion and removal therethrough of the lens holder.

15. Projecting apparatus comprising a main housing, an extension housing having a light aperture, means providing a lens aperture between the housings, a lamp socket supported approximately centrally in the main housing, a lens mount, and one or more condensing lenses in said mount, the lens mount having at its inward end, adjacent to said lamp socket and in spaced relation to the lens a light and heat shield provided with a rectangular light aperture in centered relation to the light axis, the light aperture in said shield corresponding in size and dimensions to the size and dimensions of the light aperture in said extension housing to permit the passage of a beam of light rays having a cross section at the light aperture of said extension housing corresponding to the area of the light aperture at said extension housing.

16. A lens and lamp housing structure for projectors of the class described, comprising a main housing, an extension housing at the front thereof, having a rectangular, elongated light aperture in its upper wall, the front wall of the main housing having a lens aperture between the housings, a lamp socket supported in the main housing, a reflector frame, and a reflector detachably secured to the frame, the reflector frame being substantially in plate form and acting as a light and heat shield and having a centered rectangular light aperture.

17. A lens and lamp housing structure for projectors of the class described, comprising a main housing, an extension housing at the front thereof, having a rectangular, elongated light aperture in its upper wall, the front wall of the main housing having a lens aperture between the housings, a lamp socket supported in the main housing, the extension housing having an upwardly slanting lower front wall and a hinged door closing its front opening, and a mirror detachably secured on said front wall adjacent the door, the door forming the upper abutment for the mirror, when the door is closed.

18. A lens and lamp housing structure for projectors of the class described, comprising a main housing, an extension housing at the front thereof, having a rectangular, elongated light aperture in its upper wall, the front wall of the main housing having a lens aperture between the housings, a lamp socket supported in the main housing, the extension housing having an upwardly slanting lower front wall and a hinged door closing its front opening, and a mirror detachably secured on said front wall adjacent the door and retained in position by the door, when the door is closed.

19. A lens and lamp housing structure for projectors of the class described, comprising a main housing, an extension housing at the front thereof, having a rectangular, elongated light aperture in its upper wall, the front wall of the main housing having a lens aperture between the housings, a lamp socket supported in the main housing, the extension housing having an upwardly slanting lower front wall and a hinged door closing its front opening, and a mirror detachably secured on said front wall adjacent the door, and spring clips on said front wall yieldably engaging the mirror and retaining it in position against said door, when the door is closed.

20. A lens and lamp housing structure for projectors of the class described, comprising a main housing, an extension housing at the front thereof, having a rectangular, elongated light aperture in its upper wall, the front wall of the main housing having a lens aperture between the housings, a lamp socket supported in the main housing, the extension housing having an upwardly slanting lower front wall and a hinged door closing its front opening, a mirror detachably secured on said front wall adjacent the door, and a yielding stop on said front wall engaging the inner edge of the mirror and locating it in centered relation to the light axis against said door, when the door is closed.

21. A lens and lamp housing structure for projectors of the class described, comprising a main housing, an extension housing at the front thereof, having a rectangular, elongated light aperture in its upper wall, the front wall of the main housing having a lens aperture between the housings, a lamp socket supported in the main housing, the extension housing having an upwardly slanting lower front wall and a hinged door closing its front opening, a mirror detachably secured on said front wall adjacent the door, and a yielding stop on said front wall engaging the inner edge of the mirror and urging it against the door when the latter is closed, whereupon the mirror is retained in centered relation to the light axis.

22. A lens and lamp housing structure for projectors of the class described, comprising a main housing, an extension housing at the front thereof, having a rectangular, elongated light aperture in its upper wall, the front wall of the main housing having a lens aperture between the housings, a lamp socket supported in the main housing, the extension housing having an upwardly slanting lower front wall and a hinged door closing its front opening, a mirror detachably secured on said front wall adjacent the door, the door forming the upper abutment for the mirror, when the door is closed, and spring clips on said front wall yieldably engaging the mirror and retaining it in position, the mirror being retained against end movement by engagement of its ends with side walls of the extension housing.

23. A lens and lamp housing structure for projectors of the class described, comprising a main housing, an extension housing at the front thereof, having a rectangular, elongated light aperture in its upper wall, the front wall of the main housing having a lens aperture between the housings, the extension housing having a hinged door closing its front end, a lamp socket supported in the main housing, a condensing lens located against the upper wall of the extension housing and in axially centered relation to the light aperture, and means slidingly receiving and yieldably but positively retaining the lens in proper location, the lens being additionally engaged and positioned by the door when the latter is in closed position.

24. A lens and lamp housing structure for projectors of the class described, comprising a main housing, an extension housing at the front thereof, having a rectangular, elongated light aperture in its upper wall, the front wall of the main housing having a lens aperture between the housings, the extension housing having a hinged door closing its front end, a lamp socket supported in the main housing, a condensing lens located against the upper wall of the extension housing and having portions cut away providing a flat front face and end faces of small area parallel and at right angles to the front face, the lens being laterally positioned by engagement of its end faces with side walls of the housing, and spring clips yieldably engaging the lens and retaining it against the top wall and door of the extension housing and in axially centered relation to the light aperture.

25. A lens and lamp housing structure for projectors of the class described, comprising a main housing, an extension housing at the front thereof, having a rectangular, elongated light aperture in its upper wall, the front wall of the main housing having a lens aperture between the housings, the extension housing having a hinged door closing its front end, a lamp socket supported in the main housing, a condensing lens located against the upper wall of the extension housing and having portions cut away providing a flat front face and end faces of small area parallel and at right angles to the front face, the lens being laterally positioned by engagement of its end faces with side walls of the housing, and spring clips yieldably engaging the lens and retaining it against the top wall of the housing and in axially centered relation to the light aperture, the door engaging the front face of the lens and retaining it in proper position by cooperative action of the spring clips.

26. A lens and lamp housing structure for projectors of the class described, comprising a main housing, an extension housing at the front thereof with a light aperture at its upper end, a lamp in said main housing, means for directing the light beam from said lamp into said extension housing in a horizontal direction, a reflector in said extension housing for receiving the light beam from said lamp and directing it upwardly through the light aperture at the upper end of said extension housing, a case having an objective lens, a bracket extending upwardly from said extension housing, there being a vertically extending slot in said bracket, a sleeve for supporting said case, an arm on said sleeve conformed to be received by said slot, and a screw for connecting said arm in said slot.

27. A lens and lamp housing structure for projectors of the class described, comprising a main housing, an extension housing at the front thereof with a light aperture at its upper end, a lamp in said main housing, means for directing the light beam from said lamp into said extension housing in a horizontal direction, a reflector in said extension housing for receiving the light beam from said lamp and directing it upwardly through the light aperture at the upper end of said extension housing, a case having an objective lens, a bracket extending upwardly from said extension housing, a split sleeve, means for locking said split sleeve to said case, an arm on said sleeve, there being a vertically extending slot in said bracket conformed to receive said arm, there being a plurality of screw openings in said bracket, there being a screw opening in said arm, and a screw for cooperating with the screw opening in said arm and one of the screw openings in said bracket to lock said sleeve to said bracket.

28. A lens and lamp housing structure for projectors of the class described, comprising a main housing, an extension housing at the front thereof with a light aperture at its upper end, a lamp in said main housing, means for directing the light beam from said lamp into said extension housing in a horizontal direction, a reflector in said extension housing for receiving the light beam from said lamp and directing it upwardly through the light aperture at the upper end of said extension housing, a case having an objective lens, a bracket extending upwardly from said extension housing, a split sleeve, means for locking said split sleeve to said case, an arm on said sleeve, there being a vertically extending slot in said bracket conformed to receive said arm, there being a plurality of screw openings in said bracket, there being a screw opening in said arm, and a screw for cooperating with the screw opening in said arm and one of the screw openings in said bracket to lock said sleeve to said bracket, said arm and slot being conformed to receive said arm whether extending upwardly or downwardly.

29. A projector characterized by having as elements a housing adapted to support a lamp, and provided with a light aperture, a condensing lens for said light aperture and a reflector for receiving the light beam from the lamp and directing it through the light aperture, said projector being further characterized by having means in said housing to hold said condenser lens and reflector respectively, and cooperating to position them accurately, said means comprising a spring holding-device for each of said lens and reflector respectively, and a doorway provided with a door, said springs tending to hold said elements yieldingly adjacent to, and removable through said doorway, and said door acting when closed to move said lens and reflector respectively into proper relative position.

30. A projector characterized by having as elements a housing adapted to support a lamp, and provided with a light aperture, a condensing lens for said light aperture and a reflector for receiving the light beam from the lamp and directing it through the light aperture, said projector being further characterized by having means in said housing to hold said condenser lens and reflector respectively, and cooperating to position them accurately, said means comprising a spring holding-device for each of said lens and reflector respectively, and a doorway provided with a door, said springs tending to hold said elements yieldingly adjacent to, and removable through said doorway, and said door acting when closed to move said lens and reflector respectively into proper relative position against the action of said springs.

31. A projector characterized by having as elements a housing adapted to support a lamp, and provided with a light aperture, a condensing lens for said light aperture and a reflector for receiving the light beam from the lamp and directing it through the light aperture, said projector being further characterized by having means in said housing to hold said condenser lens and reflector respectively, and cooperating to position them accurately, said means comprising a spring holding-device for each of said lens and reflector respectively, and a doorway provided with a door, said springs tending to hold said elements yieldingly adjacent to, and removable through said doorway, and said door acting when closed to move said lens and reflector respectively into proper relative position against the action of said springs, the action of said springs being to cause said lens and/or reflector, when released by the opening of said door, to project into position in which either of said elements may be grasped readily and withdrawn through the open doorway.

32. A projector characterized by having as elements a main lamp housing and an extension housing provided at its upper end with a light aperture, a condensing lens for said aperture and a reflector for receiving the light beam from the lamp and directing it upwardly through the light aperture, said projector being further characterized by having means in said extension housing to hold said condenser lens and reflector respectively and cooperating to position them accurately, said means comprising a spring holding-device for each of said lens and reflector respectively, and a doorway provided with a door, said springs tending to hold said elements yieldingly adjacent to said doorway so that they may be respectively grasped readily and withdrawn through the doorway when the door is open.

33. A projector characterized by having as elements a main lamp housing and an extension housing provided at its upper end with a light aperture, a condensing lens for said aperture and a reflector for receiving the light beam from the lamp and directing it upwardly through the light aperture, said projector being further characterized by having means in said extension housing to hold said condenser lens and reflector respectively, and cooperating to position them accurately, said means comprising a spring holding-device for each of said lens and reflector respectively, said springs tending to hold said elements yieldingly adjacent to, and removable through, said doorway, and said door being adapted to move said lens and reflector respectively into proper relative position, the action of said lens-holding spring being to cause said lens and reflector when released by the opening of said door, to project into a position in which they may be respectively grasped readily and withdrawn through the open doorway.

34. Projecting apparatus comprising a housing having a light aperture, means providing a lens aperture in said housing, a lamp socket supported approximately centrally in said housing, a lens mount in said housing, a plurality of condensing lenses detachably secured in said mount, and cooperating means at spaced points on said mount in said housing for securing the mount detachably in position adjacent the lens aperture and in laterally and longitudinally centered relation to a determined light axis of the housing.

35. Projecting apparatus comprising a housing having a light aperture, means providing a lens aperture in said housing, a lamp socket supported approximately centrally in said housing, a lens mount in said housing, a plurality of condensing lenses detachably secured in axially alined positions in the mount, and cooperating means including diametrically opposed studs and apertures on the mount in said housing for securing the mount detachably in position in said housing to register with the lens aperture and in laterally and longitudinally centered relation to a determined light axis of the housing.

36. Projecting apparatus comprising a housing having a light aperture, means providing a lens aperture in said housing, a lamp socket supported approximately centrally in said housing, a lens mount in said housing, a condensing lens detachably secured in said mount, cooperating means including a pair of apertures on said mount and a pair of studs in said housing to engage the apertures in said mount for securing the mount detachably in position in said housing to register with the lens aperture and in laterally and longitudinally centered relation to a determined light axis of said housing, said securing means including also a screw entering one of said studs and having a head bearing against said mount, and a reflector supported in said housing and at the rear in respect to the condensing lens and socket.

37. Projecting apparatus comprising a housing having a light aperture, means providing a lens aperture in said housing, a lamp socket supported approximately centrally in said housing, a lens mount, a condensing lens detachably secured in said mount by means permitting ready attachment and detachment as between said lens and mount, cooperating means on the mount and in said housing for permitting ready attachment and detachment of said lens and mount in position at the lens aperture and in laterally and longitudinally centered relation to a determined light axis of said housing, a second condensing lens, and means including a spring for removably supporting said latter condensing lens in the upper portion of said housing with its axis in rightangularly centered relation to said light axis and in centered relation to said light aperture.

38. Projecting apparatus comprising a housing having a light aperture, means providing a lens aperture in said housing, a lamp socket supported approximately centrally in said housing, a lens mount, a condensing lens detachably secured in said mount by means permitting ready attachment and detachment as between said lens and mount, cooperating means on said mount and in said housing for permitting ready attachment and detachment of said lens and mount in position at the lens aperture and in laterally and longitudinally centered relation to a determined light axis of said housing, a mirror angularly and detachably supported in said housing and in centered relation to said light axis, a second condensing lens, and means including a spring for detachably supporting said second condensing lens in the upper portion of said housing with its axis in rightangularly centered relation to said light axis and mirror and in centered relation to said light aperture.

39. Projecting apparatus comprising a housing having a light aperture, means providing a lens aperture in said housing, a lamp socket supported in said housing, one or more condensing lenses supported in said housing and operative between a lamp mounted in said socket and said light aperture, a reflector frame, a reflector, means cooperating with said frame to detachably press said reflector into engagement with said frame, and cooperating means including a spring sleeve on the reflector and a post in said housing at the rear thereof for detachably supporting the reflector frame.

40. Projecting apparatus comprising a housing having a light aperture, means providing a lens aperture in said housing, a lamp socket supported in said housing, a lens mount, a condensing lens detachably secured in said mount, cooperating means on said mount and in said housing for securing said mount detachably in position at the lens aperture and in laterally and longitudinally centered relation to a determined light axis of said housing, said housing having an aperture dimensioned to permit insertion and removal therethrough of said lens mount, a removable wall for said latter aperture, and a clip at the lower edge of said housing to anchor said removable wall against accidental displacement.

41. Projecting apparatus comprising a housing having a light aperture, means providing a lens aperture in said housing, a lamp socket supported approximately centrally in said housing, a lens mount, a condensing lens detachably secured in said mount, cooperating means on said mount and in said housing for securing said mount detachably in position at the lens aperture and in laterally and longitudinally centered relation to a determined light axis of the housing, said housing having an aperture dimensioned to permit insertion and removal therethrough of the lens mount, a removable wall for said latter aperture, a clip at the lower edge of said removable wall, and a cover for engaging the upper end of said removable wall and anchoring the same against accidental displacement.

42. A lens and lamp housing structure for projectors of the class described comprising a housing having a rectangular, elongated light aperture in its upper wall, a vertically extending lens aperture in said housing, a lamp socket supported in said housing, a separate lens holder, one or more condensing lenses detachably secured in said holder, a plurality of studs in said housing adjacent the lens aperture, the lens holder having lugs bored to receive and slidingly engage said studs, and a screw cooperating with one of the studs and detachably securing the lens holder in position in said housing at the lens aperture and in laterally and longitudinally correct locations in respect to the light axis.

43. Projecting apparatus comprising a housing having a rectangular light aperture, means providing a lens aperture in said housing, a lamp supported in said housing, a lens mount, a condensing lens in said mount in the front of said lamp, a reflector in the rear of said lamp, and a light and heat shield disposed between said reflector and said lamp, a light and heat shield disposed between said lamp and said condensing lens, said shields each having a rectangular light passage corresponding in size and dimensions to said rectangular light aperture to permit the passage of a concentrated beam of light rays from said lamp having a cross section at said light aperture corresponding to the area of said light aperture.

44. A lens and lamp housing structure for projectors of the class described comprising a main housing having a rectangular, elongated light aperture in its upper wall, a vertically extending wall in said housing having a lens aperture, a lamp socket supported in said housing, a reflector frame, and a reflector detachably secured to said frame, the reflector frame being substantially in plate form and acting as a light and heat shield and having a centered rectangular light aperture.

45. A lens and lamp housing structure for projectors of the class described comprising a main housing having a light aperture, a lens aperture in said housing, a lamp socket in said housing, said housing having a wall and a hinged door closing its upper end, a mirror detachably secured on said wall adjacent to said door, and a yielding stop on said wall engaging the inner edge of the mirror and urging it against said door when the latter is closed whereupon the mirror is retained in centered relation to the light axis.

46. A lens and lamp housing structure for projectors of the class described comprising a housing having a light aperture at its upper end, a lamp in said housing, means for directing the light beam from said lamp through said light aperture, a case having an objective lens, a bracket extending upwardly from said housing, there being a vertically extending slot in said bracket, a sleeve for supporting said case in alinement with said light aperture, an arm on said sleeve conformed to be received by said slot, and a screw for connecting said arm in said slot.

47. Projecting apparatus comprising a housing having a lens aperture, a lens mount in said housing, a lens, a yieldable device for detachably securing said lens in said mount, and cooperating means at spaced points on said mount in said housing for securing the mount detachably in position adjacent the lens aperture and in laterally and longitudinally centered relation to a determined light axis of the housing.

48. Projecting apparatus comprising a housing having a lens aperture, a lens mount in said housing, a condensing lens detachably secured in the mount, cooperating means including diametrically opposed studs fixed to said housing and elongated cylindrical apertures on the mount conforming to and registering with said studs for securing the mount detachably in position in said housing to register with the lens aperture and in laterally and longitudinally centered relation to a determined light axis of the housing.

49. Projecting apparatus comprising a housing having a lens aperture, a lens mount in said housing, a condensing lens detachably secured in said mount, and cooperating means including a pair of apertures on said mount and a pair of studs in said housing to engage the apertures in said mount for securing the mount detachably in position in said housing to register with the lens aperture and in laterally and longitudinally centered relation to a determined light axis of said housing, said securing means including also a screw entering one of said studs and having a head bearing against said mount.

50. Projecting apparatus comprising a housing having a light aperture, means providing a lens aperture in said housing, a lens mount, a condensing lens detachably secured in said mount by means permitting ready attachment and detachment as between said lens and mount, cooperating means on the mount and in said housing for permitting ready attachment and detachment of said lens and mount in position at the lens aperture and in laterally and longitudinally centered relation to a determined light axis of said housing, a second condensing lens, and means including a spring for removably supporting said latter condensing lens in said housing with its axis in reightangularly centered relation to said light axis and in centered relation to said light aperture.

51. Projecting apparatus comprising a housing having a light aperture, means providing a lens aperture in said housing, a lens mount, a condensing lens detachably secured in said mount by means permitting ready attachment and detachment as between said lens and mount, cooperating means on said mount and in said housing for permitting ready attachment and detachment of said lens and mount in position at the lens aperture and in laterally and longitudinally centered relation to a determined light axis of said housing, a mirror angularly and detachably supported in said housing and in centered relation to said light axis, a second condensing lens, and means including a spring for detachably supporting said second condensing lens in said housing with its axis in rightangularly centered relaton to said light axis and mirror and in centered relation to said light aperture.

52. Projecting apparatus comprising a housing having a lens aperture, a lens mount, a condensing lens detachably secured in said mount, cooperating means on said mount and in said housing for securing said mount detachably in position at the lens aperture and in laterally and longitudinally centered relation to a determined light axis of said housing, said housing having an aperture dimensioned to permit insertion and removal therethrough of said lens mount, a removable wall for said latter aperture, and a clip at the lower edge of said housing to anchor said removable wall against accidental displacement.

53. Projecting apparatus comprising a housing having a lens aperture, a lens mount, a condensing lens detachably secured in said mount, cooperating means on said mount and in said housing for securing said mount detachably in position at the lens aperture and in laterally and longitudinally centered relation to a determined light axis of the housing, said housing having an aperture dimensioned to permit insertion and removal therethrough of the lens mount, a removable wall for said latter aperture, a clip at the lower edge of said removable wall, and a cover for engaging the upper end of said removable wall and anchoring the same against accidental displacement.

54. A lens and lamp housing structure for projectors of the class described comprising a housing having a vertically extending lens aperture, a separate lens holder, one or more condensing lenses detachably secured in said holder, a plurality of studs in said housing adjacent the lens aperture, the lens holder having lugs bored to receive and slidingly engage said studs, and a screw cooperating with one of the studs and detachably securing the lens holder in position in said housing at the lens aperture and in laterally and longitudinally correct locations in respect to the light axis.

55. A lens and lamp housing structure for projectors of the class described comprising a main housing having a rectangular, elongated light aperture in its wall, a wall in said housing having a lens aperture, a reflector frame, and a reflector detachably secured to said frame, the reflector frame being substantially in plate form and acting as a light and heat shield and having a centered rectangular light aperture to permit the formation of a beam of light rays having a cross section at the light aperture of said housing corresponding to the dimensions of said latter light aperture.

56. A lens and lamp housing structure for projectors of the class described comprising a main housing having a wall and a hinged door closing its upper end, a mirror detachably secured on said wall adjacent to said door, and a yielding stop on said wall engaging the inner edge of the mirror and urging it against said door when the latter is closed whereupon the mirror is retained in centered relation to the light axis.

57. A lens and lamp housing structure for projectors of the class described comprising a housing having a light aperture, a lamp in said housing, means for directing the light beam from said lamp through said light aperture, a case having an objective lens, a bracket extending upwardly from said housing, there being a vertically extending slot in said bracket, a sleeve for supporting said case in alinement with said light aperture, an arm on said sleeve conformed to be received by said slot, and a screw for connecting said arm in said slot.

58. A lens and lamp housing structure for projectors of the class described comprising a main housing having a wall, a hinged door closing one end thereof, a condensing lens cut away at one end to form a plane surface detachably secured against said wall with its cut away plane surface adjacent to said door, and yieldable means on said wall engaging the inner convex face of the lens and urging it against said door when the latter is closed whereupon the condensing lens is retained in centered relation to the light axis.

AUGUST D. EITZEN.